(12) United States Patent
Malone

(10) Patent No.: US 12,092,115 B2
(45) Date of Patent: Sep. 17, 2024

(54) PUMP WITH ROTARY VALVE AND FLUID SUBMERSIBLE MOTOR

(71) Applicant: COOPER-STANDARD AUTOMOTIVE INC, Northville, MI (US)

(72) Inventor: David S. Malone, Attica, MI (US)

(73) Assignee: Cooper-Standard Automotive Inc., Northville, MI (US)

(*) Notice: Subject to any disclaimer, the term of this patent is extended or adjusted under 35 U.S.C. 154(b) by 148 days.

(21) Appl. No.: 17/825,157

(22) Filed: May 26, 2022

(65) Prior Publication Data
US 2023/0407871 A1  Dec. 21, 2023

(51) Int. Cl.
| | |
|---|---|
| *F04D 13/08* | (2006.01) |
| *F04D 1/00* | (2006.01) |
| *H02K 5/132* | (2006.01) |
| *H02K 7/116* | (2006.01) |
| *H02K 11/33* | (2016.01) |

(52) U.S. Cl.
CPC .......... *F04D 13/086* (2013.01); *F04D 1/00* (2013.01); *H02K 5/132* (2013.01); *H02K 7/1166* (2013.01); *H02K 11/33* (2016.01); *H02K 2211/03* (2013.01)

(58) Field of Classification Search
CPC ........ F04D 13/086; F04D 1/00; H02K 5/132; H02K 7/1166; H02K 11/33; H02K 2211/03
See application file for complete search history.

(56) References Cited

U.S. PATENT DOCUMENTS

| | | | |
|---|---|---|---|
| 10,570,921 B2 | 2/2020 | Geffert | |
| 11,525,458 B2* | 12/2022 | Hinrichs | F04D 29/426 |
| 2004/0103947 A1* | 6/2004 | McLane | B60H 1/00485 |
| | | | 137/625.47 |
| 2004/0173249 A1 | 9/2004 | Assmann et al. | |
| 2021/0003133 A1* | 1/2021 | Blad | F04D 29/486 |
| 2021/0067016 A1* | 3/2021 | Hunstable | H02K 1/27 |

FOREIGN PATENT DOCUMENTS

| | | |
|---|---|---|
| DE | 102017208134 A1 | 11/2018 |
| EP | 3012458 A1 | 4/2015 |
| EP | 4234937 A1 | 8/2023 |
| WO | 2009070565 A1 | 6/2009 |

OTHER PUBLICATIONS

Search Report for EP23174757.7 dated Oct. 18, 2023.

* cited by examiner

*Primary Examiner* — Charles G Freay
*Assistant Examiner* — Lilya Pekarskaya
(74) *Attorney, Agent, or Firm* — Paschall & Associates, LLC; James C. Paschall; Anthony Miologos

(57) ABSTRACT

A pump assembly and method is disclosed comprising, a pump including a pump housing having a fluid inlet and at least one fluid outlet extending from the pump housing. A magnetic body of a brushless DC motor is submerged in the fluid and drives an impeller that moves the fluid from the fluid inlet to the at least one fluid outlet. A valve rotatably mounted between the impeller and the at least one fluid outlet selectively directs the flow of fluid through the at least one fluid outlet.

18 Claims, 7 Drawing Sheets

PUMP WITH ROTARY VALVE AND FLUID SUBMERSIBLE MOTOR

TECHNICAL FIELD

This disclosure is generally directed to pumps. More specifically, it relates to a pump having an integrated valve and a fluid submersible motor.

BACKGROUND

Pumps are known and commonly used to move fluids, such as coolant in a vehicle. One example is cooling systems with water pumps, which are used for the cooling of different electrical components of the vehicle. These are hybrid or purely electric vehicles since vehicles with internal combustion engines do not comprise any electrical components that need to be cooled. Valves are used to ensure the distribution of the coolant throughout the cooling system. The valves each require an actuator with electrical control and a holder on a component of the vehicle, which results in high component costs. Additionally, electrical pump motors that drive the fluid pump's require dynamic sealing elements to keep the fluid from being pumped from entering the electrical components of the electrical pump motor and its electrical connections. The sealing elements are not only required to isolate the fluid pumping section of the pump from the motor housing, but also the motor shaft that drives the fluid impeller. Fluid that infiltrates the pump motor casing may cause failure of the pump. Therefore, it is an object of the present disclosure to provide a pump with an integrated valve and a fluid submersible pump motor.

SUMMARY

This disclosure relates to a pump having an integrated valve and a fluid submersible motor.

In a first embodiment a pump assembly is disclosed comprising a pump housing having a fluid inlet, at least one fluid outlet and an impeller for moving a fluid from the fluid inlet to the at least one fluid outlet. A motor assembly having a magnetic body, submerged in the fluid, rotates the impeller. A valve member rotatably mounted between the impeller and the at least one fluid outlet selectively directs the flow of fluid through the at least one fluid outlet.

In a second embodiment a method of controlling the flow of a fluid from a pump assembly is disclosed. The pump assembly includes a pump housing having a fluid inlet and at least one fluid outlet extending from the pump housing. The method comprising, moving a fluid from the fluid inlet to the at least one fluid outlet using an impeller driven by a magnetic body submerged in the fluid and selectively moving a valve member rotatably mounted between the impeller and the at least one fluid outlet to direct the flow of fluid through the at least one fluid outlet.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

An example pump assembly comprises a pump including a housing having an inlet, at least one outlet and an impeller for moving a fluid from the inlet to the outlet. A brushless DC electrical pump motor drives the impeller to move the fluid. A rotary valve located between the impeller and the outlet selectively directs the flow of fluid through the at least one outlet.

Figure 1:
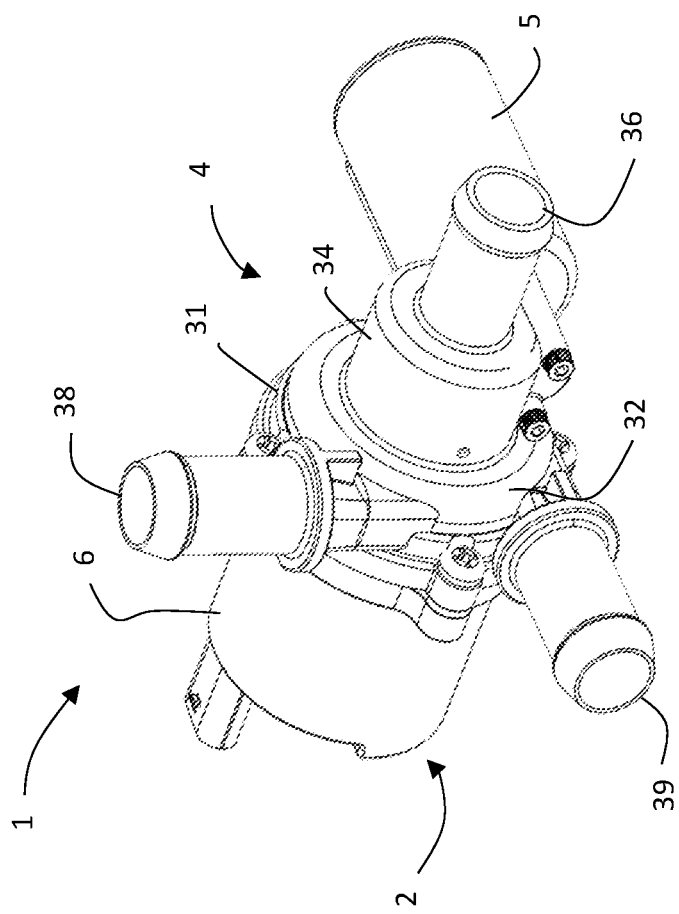
FIG. 1 illustrates a perspective view of an assembled pump assembly of the present disclosure.

FIG. 1 illustrates an example pump assembly 1 for pumping a fluid, such as a coolant, in a vehicle. As can be appreciated, the pump assembly 1 may also be used in non-vehicle applications. The example pump assembly 1 is an integration of a pump and a valve for selectively controlling flow from the pump assembly 1. The pump assembly 1 includes a motor section 2 and a pump section 4. The motor section 2 includes a motor housing 6 that houses a pump motor assembly 10 in a motor housing interior space 9, best seen in FIG. 2.

The pump section 4 includes a pump housing 31 and a valve housing 34 extending from an end of the pump housing 31 opposite the motor housing 6. A fluid inlet 36, for example a suction inlet for sucking in a fluid, in this example a coolant, is positioned centrally to the rotary axis of the valve housing 34 and pump housing 31. The pump housing 31 also includes at least one fluid outlet for discharging fluid from the pump section 4. In this embodiment, two fluid outlets 38, 39 are shown. A first fluid outlet 38, and a second fluid outlet 39 extend from pump housing 31 and are axially offset from each other such that the centers of the fluid outlets 38, 39, in the example, are oriented 90 degrees from the other. It will be appreciated by those skilled in the art, that fluid outlets 38 and 39 may be offset from each other at any other convenient angle. An actuator motor housing 5 extends orthogonally from the pump section 4. The actuator motor housing 5 is integrally formed with the pump section 4, such as by injection molding and is adapted to house an actuator motor 8 therein.

Figure 2:
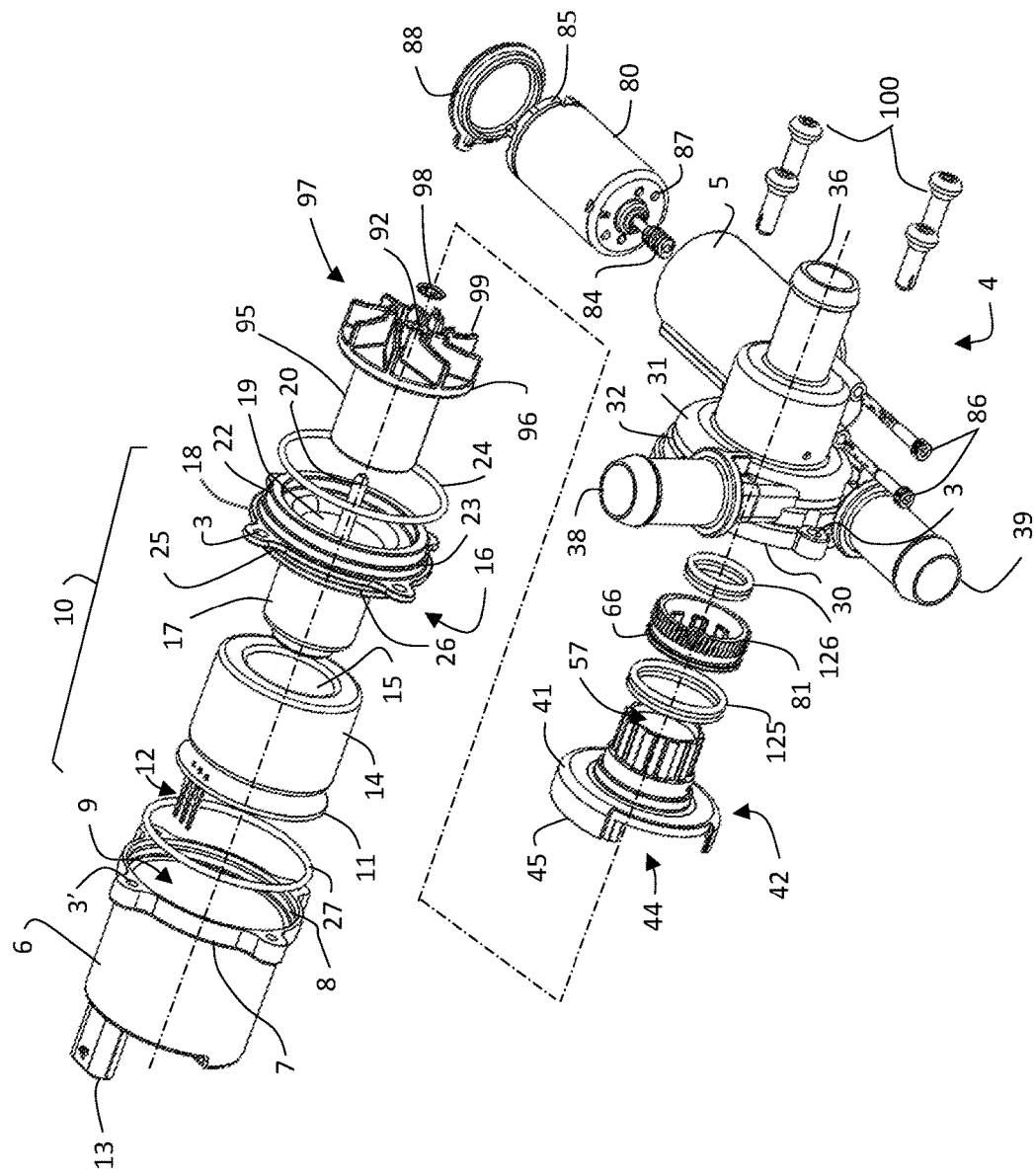
FIG. 2 illustrates an exploded view of the pump assembly of the present disclosure.
Figure 3:
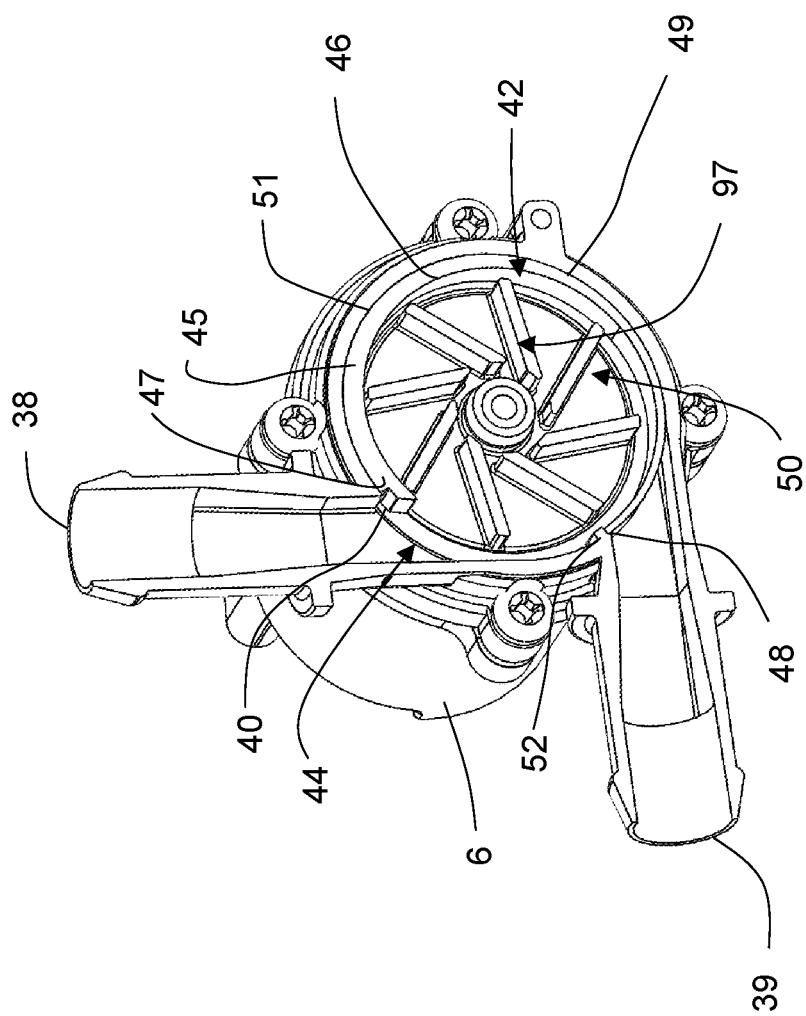
FIG. 3 illustrates a cross-sectional perspective view of a portion of the pump section of the present disclosure.

With reference to FIG. 2 an exploded view of an example pump assembly 1 of the present disclosure is illustrated. The motor assembly 10 is comprised a brushless DC electric motor (BLDC) that is housed in motor housing interior space 9. A circuit board 11 having electrical terminals 12 extends from circuit board 11. The terminals 12 are arranged to extend into a connector housing 13 are arranged to receive an electrical connector (not shown) that electrically connects to the terminals 12. The circuit board may also contain electronic circuits and a controller that electronically commutates the BLDC motor assembly 10. The connector is arranged to furnish electrical energy to circuit board 11.

The circuit board 11 is mounted to an electromagnetic subassembly housed within a sleeve 14. The electromagnetic subassembly has a laminated stack of steel plates with copper windings forming a sleeve 14 and situated about an opening 15 that operates to form the stator of the BLDC motor assembly. The opening 15 extends through the sleeve 14 axially between the copper winding stacks. The copper winding stacks of sleeve 14 are electrically connected in a three phase arrangement to the BLDC controller on circuit board 11 using any convenient manner. The controller on the circuit board 11 may provide electrical pulses of current to the winding stacks to control the speed and torque of the BLDC motor. The three phase DC signals to the winding stacks may also be developed outside of the pump assembly 1, such as for example an operating control circuit and applied to the circuit board 11 via the terminals 12 through a connector.

The motor assembly 10 further includes a pump/motor dividing housing 16 that isolates the motor assembly from the fluid pumped by the pump section 4. The dividing housing 16 comprises a cylindrical container defined by an outer surface 17 and an inner cylindrical container cavity 19. The container cavity 19 extends through the dividing housing 16 from an opening at a flange 18 located at a first end of the dividing housing 16 to a conically shaped floor member 101, best seen at FIG. 8. The flange 18 is integrally molded to and extends about the periphery of surface 17. A spindle 20 is centrally mounted in an axial orientation from the conical floor through the dividing housing 16 extending outward from flange 18. The dividing housing 16 surface 17 is arranged to be installed within opening 15 of the electromagnetic subassembly of sleeve 14. The flange 18 includes a wall extending circumferentially from a first surface 22 of the flange 18. The first surface 22 includes a groove 23 extending along an outer periphery of first surface 22. An elastomeric sealing element, such as for example an O-ring 24 is arranged to be installed in groove 23. A second surface 25 also includes a groove 26 extending along the outer periphery of second surface 25. An elastomeric sealing element, such as for example an O-ring 27 is arranged to be installed in groove 26.

The electromagnetic subassembly of sleeve 14 and the circuit board 11 are installed into the motor interior space 9 with terminals 12 installed within connector housing 13. Surface 17 of dividing housing 16 is aligned and inserted into opening 15 of sleeve 14 with the second surface 25 of flange 18 engaging circumferentially an inner complimentary surface 8 of housing 6, with O-ring 27 sealing against surfaces 25 and 8. A motor housing flange 7 extends from the motor housing 6 and includes a plurality of fastener tabs having threaded holes 3' located through each tab.

The pump section 4 also includes a flange 30 having a plurality of fastener tabs and unthreaded holes 3 located through each tab in alignment with the tabs and holes 3, 3' of flanges 7 and 18, respectively. The pump section 4 is assembled to motor section 2 by aligning flange 18 and flange 30 and drawing the pump section 4 to flange 7 of motor section 2. The first surface 22 of the flange 18 circumferentially engages an inner complimentary surface of the pump housing 32, with the O-ring 24 sealing the first surface 22 and housing 32.

Upon placement of the motor section 2 to pump section 4 and alignment of the mounting tabs and holes 3, 3' the motor section 2 is secured to the pump section 4 using suitable threaded fasteners 100. The threaded fasteners 100 pass through holes 3 to be screwed into threaded holes 3' of the of the motor housing As can be appreciated, other types of fastening devices or techniques may be used to secure the pump section 4 and the motor section 2 together.

Figure 8:
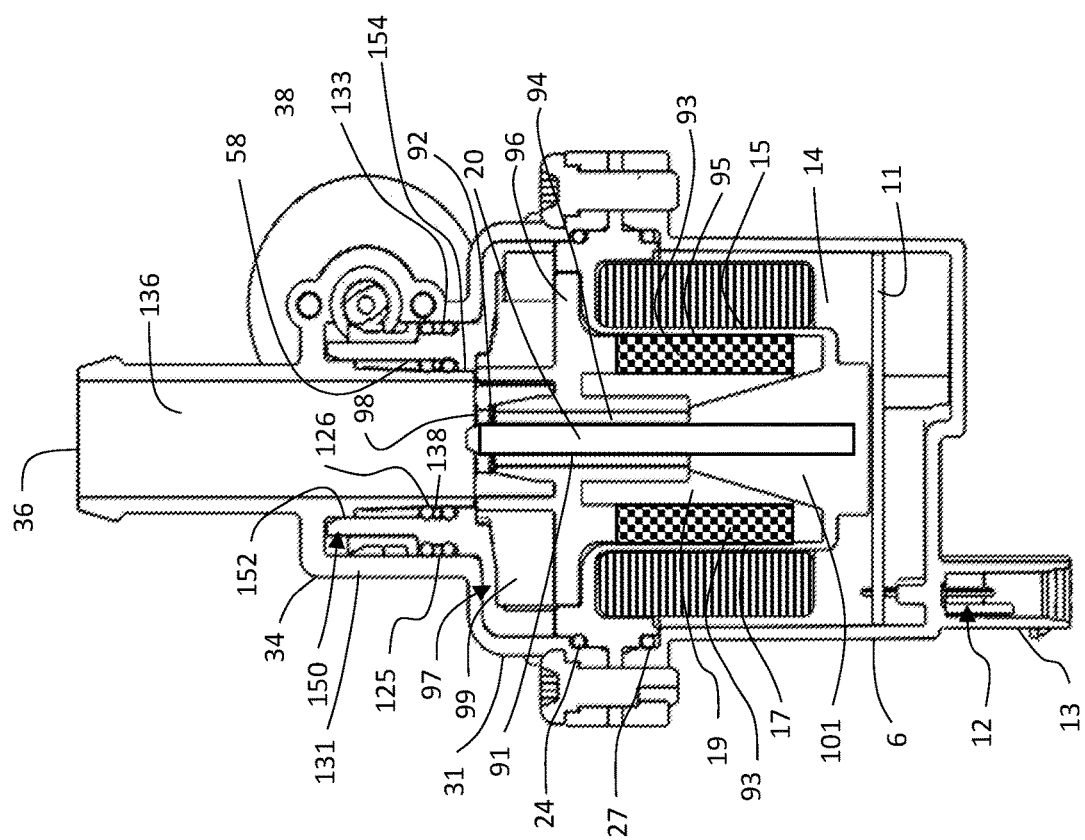
FIG. 8 illustrates a cross-sectional view through the assembled pump assembly of the present disclosure.

FIG. 2 and FIG. 8 illustrate the impeller subassembly of the present disclosure. The impeller subassembly comprises a cylindrical magnet body 95 a vane plate 96 extending circumferentially about one end of the magnet body 95 and an impeller 97. The impeller 97 includes a plurality of impeller vanes 99 extending from an external surface of the vane plate 96 arranged in a radially spaced pattern equidistant from each other outwardly from a central point to a periphery of the vane plate 96. As is best seen at FIG. 8, the magnet body 95 may include at least one permanent magnet having north or south poles housed in the interior of the magnetic body 95. Preferably, the magnet body includes a plurality of permanent magnets 93 housed in the interior of the magnetic body 95. The magnets 93 having their opposite magnetic polarities arranged on opposite sides of the magnetic body 95. A centrally located bore 91 extends through the magnetic body 95 to an opening 92 in the center of the impeller vanes 99. The bore 91 including a bushing 94 surrounding a portion of the bore 91. The magnetic body 95 is arranged to be installed within container cavity 19 of dividing housing 16 with the spindle 20 inserted into bore 91 and the bushing 94. A top portion of spindle 20 extends outward over opening 92 and is arranged to accept a retaining collar 98 on spindle 20 to retain the impeller subassembly to the spindle 20 and allow the impeller subassembly to freely rotate about the spindle 20.

The magnetic body 95 when installed in container cavity 19 places the magnets 93 within the electromagnetic field produced by the copper winding stacks of sleeve 14. The electromagnetic field produced by the copper winding stacks cause the magnet body to act as the rotor of a BLDC motor to rotationally spin the magnetic body 95 and the impeller 97 about spindle 20. The impeller 97 as will be explained later is located in the pump section 4 of the pump assembly. The container formed by outer surface 17 and container cavity 19 of the pump/motor dividing housing 16 becomes filled with the fluid pumped by the pump assembly. Container cavity 19 therefore is arranged to be open to the fluid being pumped by the impeller 97 and therefore the magnetic body 95 is submerged and operates immersed in the fluid contained in container cavity 19 with the sleeve 14 of the electromagnetic subassembly and circuit board 11 remaining isolated from the fluid.

As illustrated in FIG. 2, the pump housing 31 of pump section 4 is formed cylindrically and comprises a peripheral exterior wall 32. A fluid inlet 36, for example a suction inlet for sucking in a fluid, in this example a coolant, is positioned centrally to the rotary axis of the pump housing 31. The pump housing 31 also includes at least one fluid outlet for discharging fluid from the pump section 4. In this embodiment, two fluid outlets 38, 39 are shown. A first fluid outlet 38 and a second fluid outlet 39 extend from the wall 32 and are axially offset from each other such that the centers of the fluid outlets 38, 39, in the example, are oriented 90 degrees from the other. It will be appreciated by those skilled in the art, that fluid outlets 38, 39 may be offset from each other at any other convenient angle. The fluid outlets 38, 39 are fluidly connected to a pump cavity 50.

FIGS. 2-5, illustrate an example adjustable valve member 42 of the present disclosure. The valve member 42 is radially located outside the impeller 97 and inside the pump cavity 50. The valve member 42 is arranged to switch the fluid through the respective fluid outlets 38, 39. The valve member 42 is comprised of an annular valve element 41 having a wall 45 with an exterior wall surface 49 and an interior wall surface 46 and a rectangular opening 44 extending through wall 45. In this example, wall 45 of the valve element is spirally voluted from a generally thicker wall section at a first end 47 of opening 44 to a generally thinner wall section at a second end 48 of the opening 44. The impeller 97 is arranged to rotate inside the annular valve element 41 and the voluted interior wall surface 46. The pump housing 31 includes a stop member 52 extending into cavity 50. The wall 45 further includes a stop surface 40 located at first end 47 of opening 44.

Figures 4, 5:
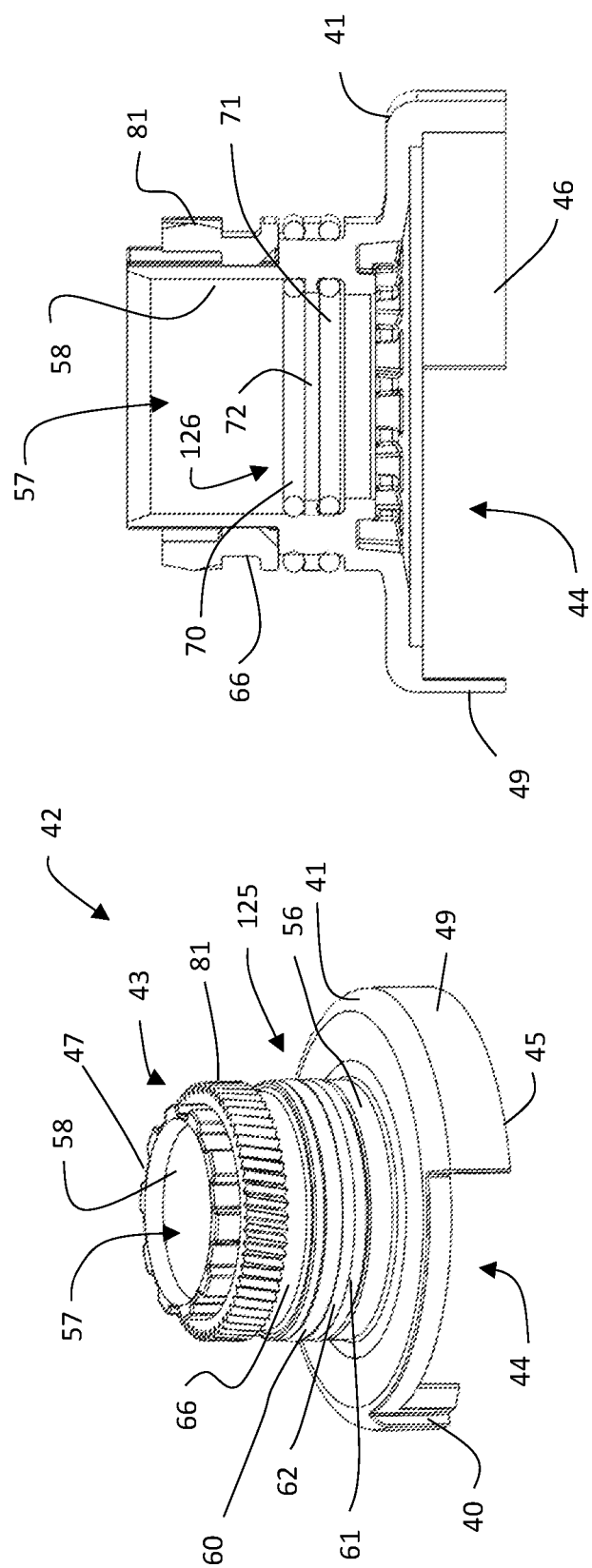
FIG. 4 illustrates a perspective view of the valve member of the present disclosure.
FIG. 5 illustrates a cross-sectional view through the valve member of FIG. 4 of the present disclosure.

The example valve member 42 of the present disclosure includes a cylindrical inlet member 47 located at upper section 43 of valve member 42. The upper section 43 of the valve member 42 further includes an annular outer surface 56 and an internal passage 57 enclosed by an annular interior surface 58. The outer surface 56 of upper section 43 includes an exterior sealing assembly 125 consisting of first and second elastomeric sealing members 60, 61 separated by a spacer 62. The exterior sealing assembly 125 is located circumferentially about the perimeter of outer surface 56. The internal passage 57 further includes an interior sealing assembly 126 consisting of third and fourth sealing members 70, 71 separated by spacer 72, as is shown at FIG. 5. The interior sealing assembly 126 is located parallel with and directly opposite from the exterior sealing assembly 125. The exterior and interior sealing assemblies are used to provide a fluid tight seal between the valve member 42 and the valve housing 34.

As is shown in FIG. 8, the upper section 43 of the valve member 42 is arranged to be assembled within an annular mounting cavity 150 formed in the interior of the valve housing 34. The annular mounting cavity 150 extends internally in valve housing 34 defined by a wall 131. The mounting cavity 150 accepting therein the upper section 43 of valve member 42. The mounting cavity 150 includes an upper annular bearing surface 152 and a lower annular bearing surface 154. An upper portion of the valve member 42 interior surface 58 traversing against the upper bearing surface 152 and a lower portion of the valve member 42 interior surface 58 traversing against the lower bearing surface 154.

The internal passage 57 receives a tubular portion 136 of fluid inlet 36 that directs fluid at low pressure to the impeller 97. The exterior sealing assembly 125 seals against an interior surface 133 of mounting cavity 150. The interior sealing assembly 126 seals against surface 138 of the mounting cavity 150. Sealing assembles 125 and 126 are comprised of, for example, of O-rings fabricated from an elastomeric material such as Ethylene Propylene Diene Monomer: (EPDM) rubber or the like.

Figure 6:
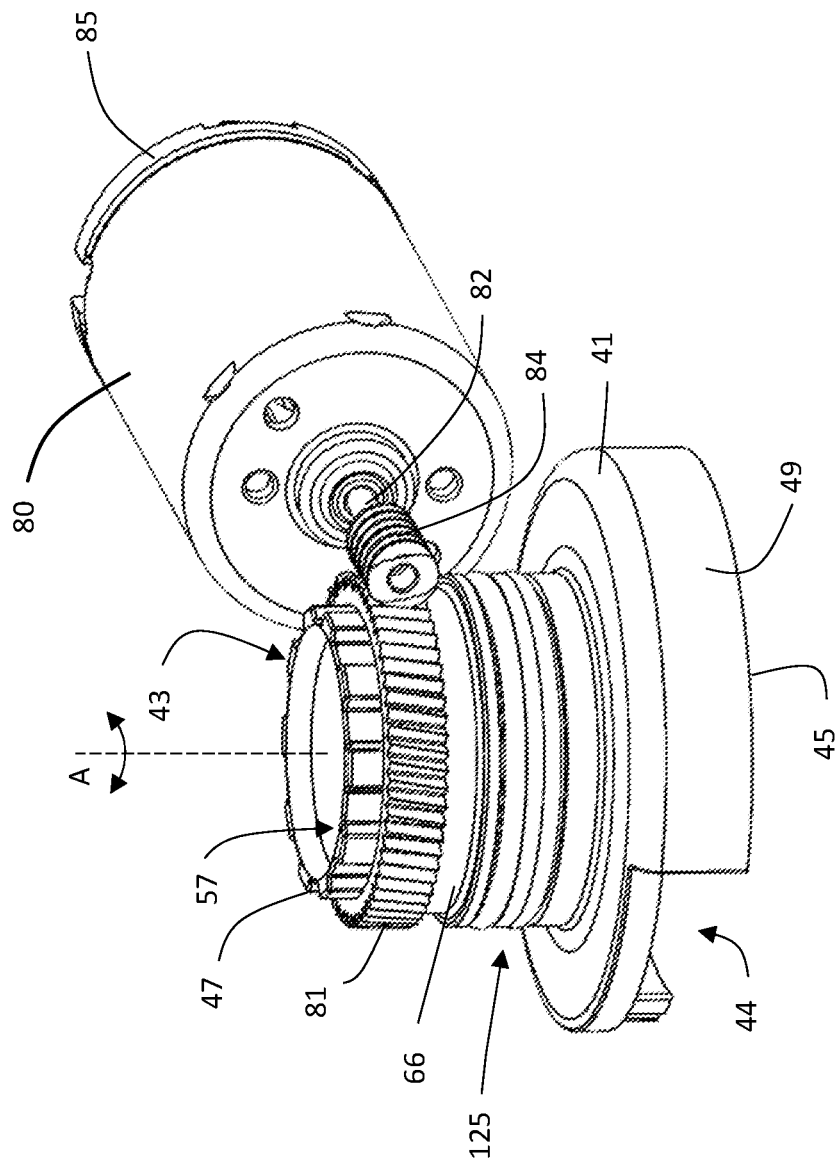
FIG. 6 illustrates a perspective view of the assembly of the valve member and actuator motor of the present disclosure.

With renewed reference to FIGS. 4 and 5, the upper section 43 of the valve member 42 further includes an actuation ring 66 having a spline tooth gear band 81 attached about the periphery of the outer surface 56. As is shown in FIG. 6, the teeth of the gear band 81 are arranged to be mechanically engaged to a worm gear member 84 attached to a shaft 82 of an actuator motor 80. The valve member 42 is rotatable about a central axis A to adjust the fluid flow from the pump cavity 50 to fluid outlets 38, 39. In this regard, the valve member 42 may be considered to be a rotary valve.

With reference to FIGS. 1, 2 and 6, an example actuator motor 80 of the present disclosure is illustrated. The actuator motor 80 is arranged to be housed within the actuator motor housing 5 of the pump section 4. The actuator motor 80 includes a motor shall 82 attached to the worm gear member 84 that engages the gear band 81 of the actuation ring 66. Rotation of the gear band 81 by worm gear 84 causes rotation of the valve member 42 about central axis A.

The actuator motor 80 is electrically connected to a remotely located controller through an electrical circuit section 85 on a rear face of the actuator motor 80 using an electrical connector (not shown). The controller selectively signals the actuator motor 80 to rotate worm gear 84 and thereby to cause rotation of valve member 42. As shown in FIG. 2, the actuator motor 80 is secured to actuator motor housing 5 using fasteners 86 that engage threaded holes 87 located on a front face of actuator motor 80 and a rear cover plate 88 is installed over electrical section 85. In operation, rotation of the valve member 42 selectively positions opening 44 to switch fluid flow from the pump cavity 50 to either the first fluid outlet 38 or the second fluid outlet 39 thereby controlling the discharge of fluid from the pump section 4.

Figure 7B:
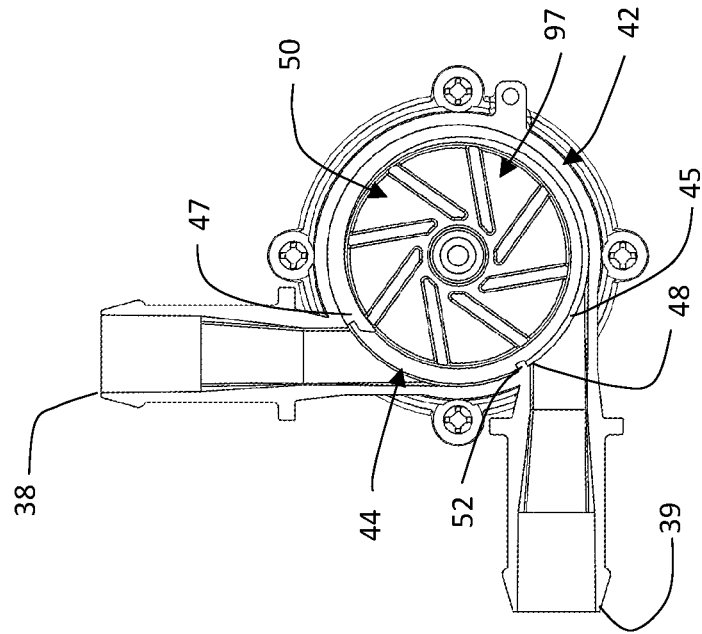
FIG. 7B illustrates a cross-sectional view of a portion of the pump assembly of the present disclosure, with the valve member in a second position.
Figure 7A:
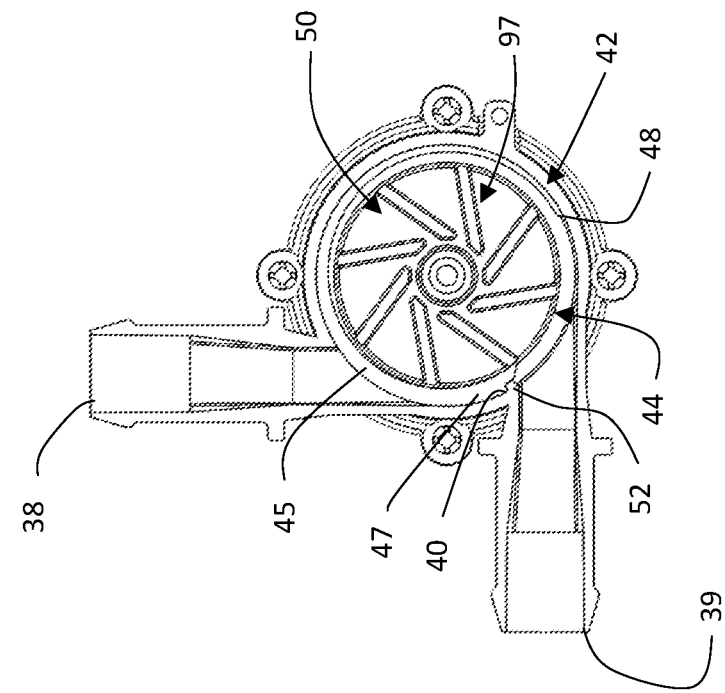
FIG. 7A illustrates a cross-sectional view of a portion of the pump assembly of the present disclosure, with the valve member in a first position.

Referring to FIGS. 7A and 7B, the operation of the valve member 42 will now be explained. The pump cavity 50 of the pump housing 31 includes impeller 97 rotating within valve member 42 driven by magnetic body 95. The impeller 97 receives fluid from fluid inlet 36 through tubular portion 136 extending through internal passage 57 of the valve member 42. The impeller 97 drives the fluid introduced into the pump cavity 50. In FIG. 7A, the actuator 80 has rotated the actuation ring 66 of valve member 42 counterclockwise to place opening 44 into a first position that is in alignment with the second fluid outlet 39. Stop surface 40 located at the first end 47 of opening 44 engages and stops against stop member 52, providing a positive indication of the alignment of opening 44 with second fluid outlet 39. In the first position fluid driven by the impeller 97 is diverted entirely through the first fluid outlet 39. Wall 45 of the valve member 42 closing off and obstructing flow of the fluid to first fluid outlet 38.

In FIG. 7B, the actuator 80 has rotated the actuation ring 66 of valve member 42 clockwise to a second position that aligns opening 44 with the first fluid outlet 38. In the second position an end portion of second end 48 of opening 44 engages and stops against stop member 52, providing a positive indication of the alignment of opening 44 with first fluid outlet 38. In the second position, wall 45 closes off and obstructs the flow of the fluid to the second fluid outlet 39 switching the fluid driven by impeller 97 to be directed through the first fluid outlet 38.

It will be well understood by those skilled in the art that based on the location of the opening 44, the fluid may be discharged from both fluid outlets 38 and 39 simultaneously. Opening 44 may be positioned to allow approximately one-half of the fluid volume to be output through first fluid outlet 38 and approximately the remainder one-half of the fluid volume through the second fluid outlet 39. Opening 44 could also be positioned to provided other proportional output flows from fluid outlets 38, 39. For example, the actuator 80 may selectably rotate actuation ring 66 to position opening 44 to direct 60 percent of the fluid flow through the first fluid outlet 38 and 40 percent through the second fluid outlet 39. Thus, by controlling the position of opening 44 not only does the valve member 42 selectively control from which fluid outlet fluid is discharged, but also the amount of fluid discharged from both fluid outlets 38, 39.

It may be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," or "controller" within a claim is understood and intended to refer to structures known to those skilled in the relevant art, as further modified or enhanced by the features of the claims themselves and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A pump assembly comprising:
    a pump including a pump housing having a fluid inlet;
    at least one fluid outlet extending from the pump housing;
    an impeller for moving a fluid from the fluid inlet to the at least one fluid outlet;
    a motor assembly having a magnetic body that rotates the impeller, the magnetic body submerged in the fluid;
    an electromagnetic subassembly housed within a sleeve situated about an opening extending through the sleeve, the electromagnetic subassembly arranged to produce an electromagnetic field;
    a container having a cavity, the cavity arranged to retain the fluid therein; and
    a spindle extending through the cavity, wherein the container is positioned within the sleeve and in the electromagnetic field; and
    a valve member rotatably mounted between the impeller and the at least one fluid outlet for selectively directing the flow of fluid through the at least one fluid outlet.

2. The pump assembly of claim 1, wherein the motor assembly includes:
    a housing having an interior space;
    a circuit board having terminals for connecting the circuit board to a source of electrical energy; and
    the electromagnetic subassembly comprises a laminated stack of steel plates with electrical windings forming the sleeve situated about the opening extending through the sleeve, the electrical windings connected to the circuit board and to a source of commutated DC voltage produced by the electrical energy, wherein the electrical windings produce the electromagnetic field.

3. The pump assembly of claim 2, wherein the impeller is mounted to one end of the magnetic body, the magnetic body further includes:
    at least one magnet having magnetic poles of opposite polarities housed in the magnetic body; and
    a bore extending through the magnetic body and rotatably mounted on the spindle with the magnetic body submerged in the fluid in the cavity with the at least one magnet within the magnetic field, the magnetic field causing the magnetic body to rotate about the spindle and rotate the impeller.

4. The pump assembly of claim 1, wherein the valve member includes a valve element having an annular wall with at least one opening extending through the annular wall.

5. The pump assembly of claim 4, wherein the valve element wall has an interior surface that is spirally voluted from a thicker wall section at a first end of the at least one opening to a thinner wall section at a second end of the at least one opening.

6. The pump assembly of claim 5, wherein the impeller is arranged to rotate inside the valve element voluted interior surface to direct the flow of fluid through the at least one opening from the fluid inlet.

7. The pump assembly of claim 4, wherein the valve member further includes an actuation ring having a gear band mounted to the valve member.

8. The pump assembly of claim 7, wherein the pump assembly further includes:
    an actuator motor having a worm gear engaged with the gear band, the actuator motor driving the actuation ring to rotate the valve member and the valve element; and
    a first fluid outlet and a second fluid outlet, wherein the actuator motor drives the valve member to selectively move the valve element between a first position that blocks the first fluid outlet with the valve element wall and positions the at least one opening with the second fluid outlet and a second position that blocks the second fluid outlet with the valve element wall and positions the at least one opening with the first fluid outlet.

9. A method of controlling flow of a fluid from a pump assembly, wherein the pump assembly including a pump housing having a fluid inlet and at least one fluid outlet extending from the pump housing, the method comprising:
    moving a fluid from the fluid inlet to the at least one fluid outlet using an impeller;
    driving the impeller with a magnetic body submerged in the fluid;
    mounting an electromagnetic subassembly within a sleeve situated about an opening extending through the sleeve, the electromagnetic subassembly arranged to produce an electromagnetic field;
    providing a container having a cavity arranged to retain the fluid therein;
    mounting a spindle through the cavity;

locating the container in the electromagnetic field; and selectively moving a valve member rotatably mounted between the impeller and the at least one fluid outlet to direct the flow of fluid through the at least one fluid outlet.

10. The method of claim 9, wherein the motor assembly includes a housing having an interior space, the method further comprising:

locating a circuit board in the interior space connected to a source of electrical energy;

the electromagnetic subassembly having a stack of steel plates with electrical windings forming the sleeve situated about the opening that extends through the sleeve; and connecting the windings to the circuit board and to a source of commutated DC voltage produced by the electrical energy, wherein the electrical windings produce the electromagnetic field.

11. The method of claim 10, wherein the method further includes:

mounting the impeller to one end of the magnetic body;

installing at least one magnet having magnetic poles of opposite polarities in the magnetic body;

providing a bore extending through the magnetic body; and rotatably mounting the spindle in the bore and submerging the magnetic body in the fluid contained in the cavity locating the magnets within the magnetic field causing the magnetic body to rotate about the spindle and rotate the impeller.

12. The method of claim 9, wherein selectively moving the valve member includes positioning at least one opening of the valve member into a position between the impeller and the at least one fluid outlet to direct the fluid flow through the at least one fluid outlet.

13. The method of claim 12, wherein selectively moving the valve member includes using an actuator motor to rotate the valve member.

14. The method of claim 13, wherein the valve member has an interior surface that is spirally voluted from a thicker wall section at a first end of the at least one opening to a thinner wall section at a second end of the at least one opening.

15. The method of claim 14, wherein the impeller is arranged to rotate inside the valve member volute.

16. The method of claim 9 wherein the method further includes:

providing an actuation ring having a gear band mounted to the valve member.

17. The method of claim 16, wherein the pump assembly further includes a first fluid outlet and a second fluid outlet, the method further including:

engaging an actuator motor having a worm gear with the gear band, the actuator motor driving the actuation ring to rotate the valve member and the valve element; and selectively rotating the valve member between a first position that blocks the first fluid outlet with a valve element wall and positions the at least one opening with the second fluid outlet and a second position that blocks the second fluid outlet with the valve element wall and positions the at least one opening with the first fluid outlet.

18. A pump assembly comprising:

a pump including a pump housing having a fluid inlet;

at least one fluid outlet;

an impeller for moving a fluid from the fluid inlet to the at least one fluid outlet;

a magnetic body that rotates the impeller, the magnetic body submerged in the fluid;

an electromagnet that generates an electromagnetic field housed within a sleeve about an opening extending through the sleeve;

a container arranged to retain the fluid therein;

a spindle extending through the container, wherein the container is positioned within the sleeve and in the electromagnetic field; and a valve member rotatably mounted between the impeller and the at least one fluid outlet for selectively directing the flow of fluid through the at least one fluid outlet.

* * * * *